(12) United States Patent
Gibbon et al.

(10) Patent No.: US 10,136,380 B2
(45) Date of Patent: *Nov. 20, 2018

(54) CLIENT-SIDE LOCATION AWARE NETWORK SELECTION

(71) Applicant: AT&T INTELLECTUAL PROPERTY I, L.P., Atlanta, GA (US)

(72) Inventors: David Crawford Gibbon, Lincroft, NJ (US); Andrea Basso, Turin (IT)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/226,288

(22) Filed: Aug. 2, 2016

(65) Prior Publication Data

US 2016/0345240 A1 Nov. 24, 2016

Related U.S. Application Data

(63) Continuation of application No. 14/092,069, filed on Nov. 27, 2013, now Pat. No. 9,432,478.

(51) Int. Cl.
*G06F 15/16* (2006.01)
*H04W 48/06* (2009.01)
(Continued)

(52) U.S. Cl.
CPC ......... *H04W 48/06* (2013.01); *H04L 65/1059* (2013.01); *H04L 65/4084* (2013.01);
(Continued)

(58) Field of Classification Search
CPC . H04W 48/06; H04L 65/1059; H04L 65/4084
(Continued)

(56) References Cited

U.S. PATENT DOCUMENTS 6,625,135 B1 9/2003 Johnson et al.
7,089,005 B2 8/2006 Reddy
(Continued)

FOREIGN PATENT DOCUMENTS

EP          1999977 A1    12/2005
WO    2000028768         5/2000
(Continued)

OTHER PUBLICATIONS

PCT/US2014/067082 International Preliminary Report on Patentability dated Jun. 9, 2016.
(Continued)

*Primary Examiner* — Vivek Srivastava
*Assistant Examiner* — Atta Khan
(74) *Attorney, Agent, or Firm* — Guntin & Gust, PLC; Joseph Hrutka

(57) ABSTRACT

A mobile device that incorporates the subject disclosure may perform, for example, operations including requesting transport characteristics of a network coupled to a server and to the device according to a trajectory of the device. Data packets are transported to the mobile device according to a dynamic adaptive streaming over hypertext transfer protocol. The operations include obtaining the current transport characteristics of the network and predicting a future transport characteristic of the network, according to the trajectory of the device. A time is scheduled for sending a request to the server for transmission over the network of a data packet. The time can be scheduled according to the current and future transport characteristics of the network, to avoid degradation in quality of media content presented by the device. The data packet received responsive to sending the request is buffered for a future presentation of the media content. Other embodiments are disclosed.

20 Claims, 9 Drawing Sheets

(51) Int. Cl.
*H04L 29/08* (2006.01)
*H04W 4/029* (2018.01)
*H04L 29/06* (2006.01)
*H04W 48/18* (2009.01)

(52) U.S. Cl.
CPC ........ *H04L 65/4092* (2013.01); *H04L 65/602* (2013.01); *H04L 65/80* (2013.01); *H04L 67/22* (2013.01); *H04L 67/325* (2013.01); *H04W 4/029* (2018.02); *H04W 48/18* (2013.01)

(58) Field of Classification Search
USPC .......................................................... 709/219
See application file for complete search history.

(56) References Cited

U.S. PATENT DOCUMENTS

| | | | |
|---|---|---|---|
| 7,146,298 B2 | 12/2006 | Motamedi et al. | |
| 7,505,433 B2 | 3/2009 | Yaqub et al. | |
| 7,697,479 B2 | 4/2010 | Metke et al. | |
| 7,840,227 B2 | 11/2010 | Kahlert et al. | |
| 7,877,439 B2* | 1/2011 | Gallou | H04L 29/06027 709/203 |
| 7,877,525 B1* | 1/2011 | Sun | H04L 65/4084 709/217 |
| 7,913,282 B2* | 3/2011 | Ishikawa | H04N 7/17318 709/213 |
| 8,000,726 B2 | 8/2011 | Altman et al. | |
| 8,139,539 B2 | 3/2012 | Jung et al. | |
| 8,218,512 B2 | 7/2012 | Yaqub | |
| 8,239,911 B1* | 8/2012 | Sun | H04N 21/2187 725/118 |
| 8,392,611 B2 | 3/2013 | Leighton et al. | |
| 8,792,439 B2* | 7/2014 | Kahn | H04W 28/22 370/232 |
| 8,850,054 B2* | 9/2014 | Burckart | H04L 65/4084 709/231 |
| 2010/0040016 A1* | 2/2010 | Lor | H04W 12/06 370/331 |
| 2010/0172329 A1* | 7/2010 | Yokoyama | H04W 36/30 370/332 |
| 2011/0093605 A1* | 4/2011 | Choudhury | H04L 65/4084 709/231 |
| 2011/0317631 A1* | 12/2011 | Navda | H04W 72/1231 370/329 |
| 2012/0007733 A1* | 1/2012 | Cho | H04W 52/0261 340/539.3 |
| 2012/0009890 A1* | 1/2012 | Curcio | H04L 29/06 455/230 |
| 2012/0317432 A1* | 12/2012 | Assad | G06F 1/329 713/340 |
| 2014/0013375 A1* | 1/2014 | Giladi | H04L 67/108 725/112 |
| 2014/0095597 A1* | 4/2014 | McNeil | G06Q 50/01 709/204 |

FOREIGN PATENT DOCUMENTS

| | | |
|---|---|---|
| WO | 2001058182 | 8/2001 |
| WO | 2002093955 | 11/2002 |
| WO | 2011020481 A1 | 2/2011 |
| WO | 2011162881 A1 | 12/2011 |
| WO | 2011162906 A1 | 12/2011 |
| WO | 2013104445 A1 | 7/2013 |

OTHER PUBLICATIONS

Inzerilli, Tiziano et al., "A location-based vertical handover algorithm for limitation of the ping-pong effect." Networking and Communications, 2008. IMOB'08. IEEE International Conference on Wireless and Mobile Computing,. IEEE, 2008.

Ormond, Olga et al., "Utility-based intelligent network selection in beyond 3G systems." Communications, 2006. ICC'06. IEEE International Conference on. vol. 4. IEEE, 2006.

Shen, Wei et al., "Cost-function-based network selection strategy in integrated wireless and mobile networks." Vehicular Technology, IEEE Transactions on 57.6 (2008): 3778-3788.

Stevens-Navarro, Enrique et al., "An MDP-based vertical handoff decision algorithm for eterogeneous wireless networks." Vehicular Technology, IEEE Transactions on 57.2 (2008): 1243-1254.

Zhang, Jie , "WLC14-6: A Location-Based Vertical Handoff Decision Algorithm for Heterogeneous Mobile Networks." Global Telecommunications Conference, 2006. GLOBECOM'06. IEEE. IEEE, 2006.

* cited by examiner

300

400

CLIENT-SIDE LOCATION AWARE NETWORK SELECTION

CROSS-REFERENCE TO RELATED APPLICATION(S)

This application is a continuation of and claims priority U.S. patent application Ser. No. 14/092,069, filed Nov. 27, 2013. The disclosure of which is hereby incorporated by reference in its entirety.

FIELD OF THE DISCLOSURE

The subject disclosure relates to a media distribution and content delivery management over networks, and more specifically to a method of using information regarding network segments for network selection to improve transmission of data for a client at a particular geographic location.

BACKGROUND

A mobile media device, moving into and out of multiple network segments or regions, may encounter differing network capabilities. Data transmission rates to and from the mobile device typically depend upon the available bandwidth at the time the device is at a given location.

BRIEF DESCRIPTION OF THE DRAWINGS

Reference will now be made to the accompanying drawings, which are not necessarily drawn to scale, and wherein.

DETAILED DESCRIPTION

Figure 1:
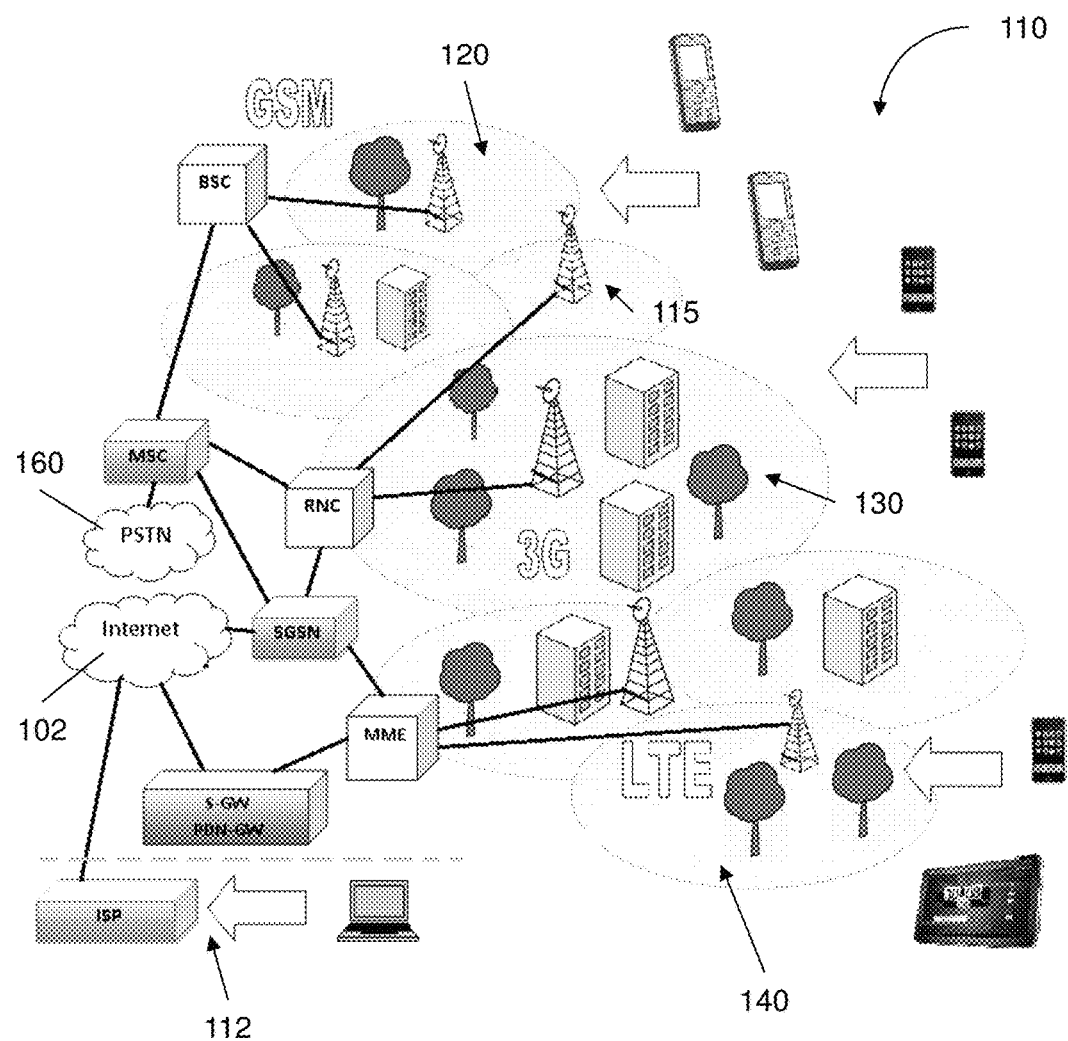
FIG. 1 depicts an illustrative embodiment of an architecture for a cellular network for interacting with mobile communication devices.

The subject disclosure describes, among other things, illustrative embodiments of a device and method for providing data to a mobile device via a network. In one or more embodiments, requests for data transmission can be managed (e.g., scheduled and/or rescheduled) according to various factors, such as one or more of current network performance characteristics, predicted network performance characteristics, movement of the mobile device, and so forth. In one embodiment, the mobile device can be communicatively coupled with a first network when at a first location and subsequently with a second network in accordance with physical movement of the mobile device, and transmission of a request can be deferred until the mobile device is communicatively coupled with the second network or a pending request can be canceled responsive to the mobile device being communicatively coupled with the second network. In one or more embodiments, a second location of the mobile device can be predicted according to the trajectory of the physical movement of the mobile device when the mobile device is at a first location.

Other embodiments are included in the subject disclosure.

The exemplary embodiments described herein are related to, and can be combined with or replaced by, methods and/or components described in U.S. application Ser. No. 14/092,092, entitled "CLIENT-SIDE SCHEDULING FOR MEDIA TRANSMISSIONS ACCORDING TO CLIENT DEVICE STATES", now U.S. Pat. No. 9,629,104, the disclosure of which is hereby incorporated by reference.

One embodiment of the subject disclosure includes a mobile device having a memory to store instructions and a controller coupled to the memory. The controller, responsive to executing the instructions, can perform operations including requesting current transport characteristics of a network communicatively coupled to a server and to the mobile device according to a trajectory of physical movement of the mobile device. Data packets can be transported by the network to the mobile device according to a dynamic adaptive streaming over hypertext transfer protocol. The controller can also obtain the current transport characteristics of the network and predict a future transport characteristic of the network in accordance with the trajectory of the physical movement of the mobile device. The controller can also schedule a time for sending a request to the server for transmission over the network of a data packet. The time for sending the request for transmission of the data packet can be scheduled in accordance with the future transport characteristic and the current transport characteristics of the network, to avoid a degradation in a viewing quality of video content presented by the mobile device. The operations further include sending the request responsive to detecting the time to send the request, receiving the data packet responsive to sending the request, and buffering the data packet for a future presentation of the media content, wherein the trajectory of the physical movement of the mobile device is on a path having network elements that provide varying transmission rates to the mobile device.

One embodiment of the subject disclosure includes a method including requesting, by a mobile device comprising a processor, current transport characteristics of a network communicatively coupled to a server and to the mobile device according to a trajectory of the mobile device. Data packets are transported by the network to the mobile device according to a dynamic adaptive streaming over hypertext transfer protocol. The method can include obtaining, by the mobile device, the current transport characteristics of the network. The method can include predicting, by the mobile device, a future transport characteristic of the network in accordance with the trajectory of the mobile device. The method can include scheduling, by the mobile device, a time for sending a request to the server for transmission over the network of a data packet. The time for sending the request for transmission of the data packet can be scheduled in accordance with the future transport characteristic and the current transport characteristics of the network, to avoid a degradation in a viewing quality of media content presented by the mobile device. The trajectory of the mobile device is on a path having network elements that provide varying transmission rates to the mobile device.

The subject disclosure describes an illustrative example in which a mobile device's trajectory is the cause of an anticipated network variability. It should be understood that the subject disclosure also applies to other cases of anticipated network change such as a planned network maintenance event, radio channel fading, or growing network demand based on network observations or historical periodic trends. The subject disclosure also applies to stationary devices in such cases.

One embodiment of the subject disclosure includes a computer-readable storage device comprising executable instructions which, when executed by a processor, cause the processor to perform operations. The operations include requesting transport characteristics of a network communicatively coupled to a server and to the mobile device according to a trajectory of the mobile device. Data packets are transported by the network to the mobile device according to a dynamic adaptive streaming over hypertext transfer protocol. The operations can include obtaining the current transport characteristics of the network. The operations can include predicting a future transport characteristic of the network, in accordance with the trajectory of the mobile device. The operations can include scheduling a time for sending a request to the server for transmission over the network of a data packet. The time for sending the request for transmission of the data packet can be scheduled in accordance with the future transport characteristic and the current transport characteristics of the network, to avoid a degradation in a quality of media content presented by the mobile device. It should be understood that the subject disclosure can be applied to any scheme for delivering media or other data to a client where a local buffer is utilized and that the dynamic adaptive streaming over hypertext transport protocol is an illustrative example.

FIG. 1 schematically illustrates an architecture 100 for a cellular network. Mobile devices 110 with a variety of technologies (phones, tablets, etc.) have an end-to-end connection established with either a Public Switched Telephone Network (PSTN) 160, in the case of voice traffic, or an internet protocol network (Internet) 102, in the case of data traffic. As shown schematically in FIG. 1, a given mobile device can move through geographic regions having different and sometimes overlapping networks with different characteristics. A mobile device accesses a network by connecting with a base station 115 belonging to that network. As shown in FIG. 1, the architecture can include a Global System for Mobile Communications (GSM) network 120, a 3G network 130, and/or a Long Term Evolution (LTE) network 140. In particular, LTE specifications can define an internet protocol architecture with voice over internet protocol (VoIP). FIG. 1 also illustrates a device accessing the network through an Internet Service Provider (ISP) broadband connection 112.

In general, a mobile device that is in motion can connect with a variety of networks and therefore receives and transmit data at different rates at different times. A network itself (e.g. LTE network 140) may be intermittently available at a given location. It also will be appreciated that a mobile device client receiving data from a server might not connect directly to that server, but rather to a proxy or network of proxies that communicate and advantageously manage traffic over network segments with varying network characteristics.

Figure 2:
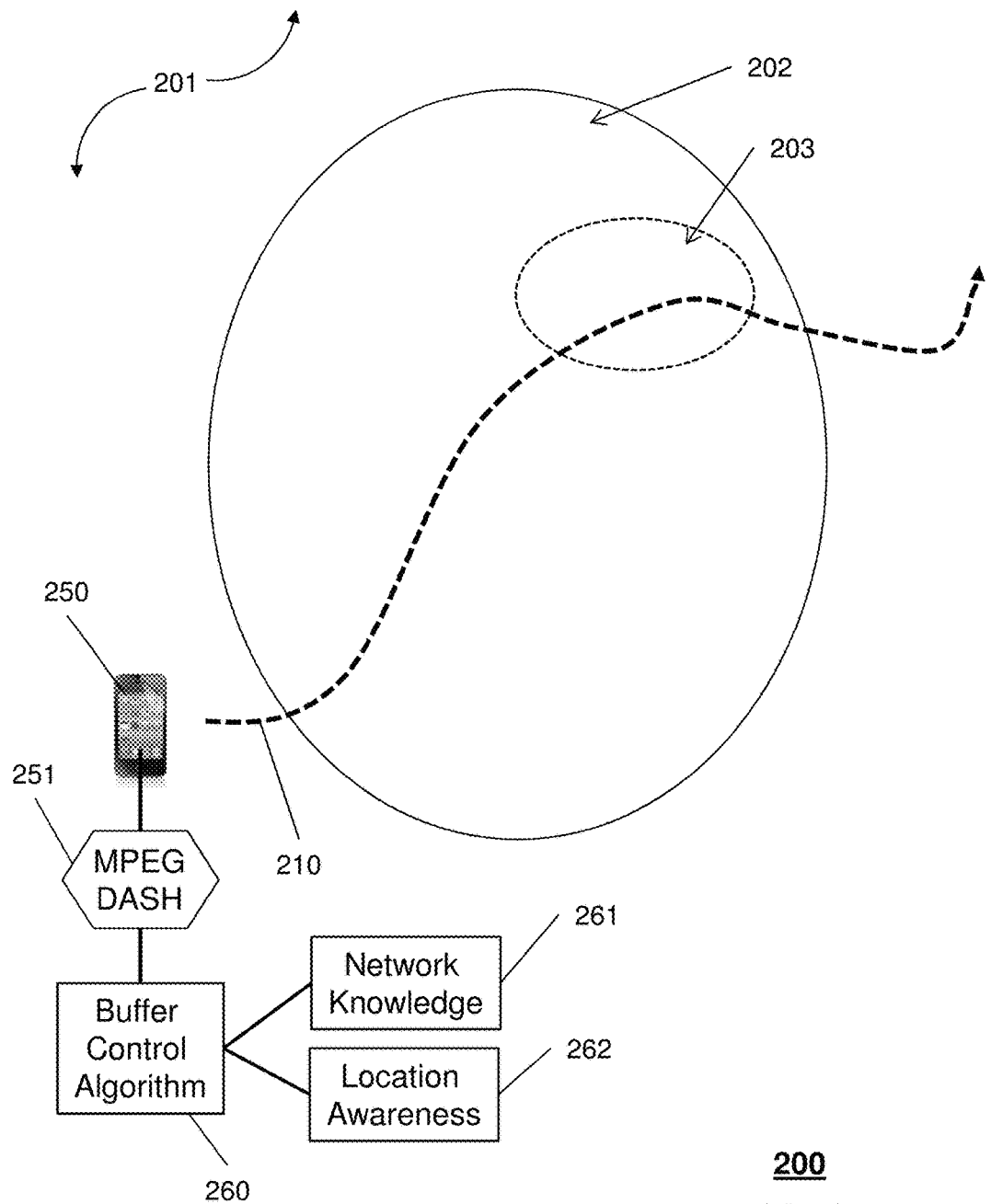
FIG. 2 depicts an illustrative embodiment of a mobile device moving through areas of differing network capabilities.

FIG. 2 depicts an illustrative embodiment 200 in which a mobile device (in this example, personal media device 250) moving in and out of multiple network regions may encounter differing network capabilities. A region can correspond to an area of coverage of a distinct network or an area of coverage of a segment of a larger network. Knowledge of a network region into which a personal media device may be moving allows for improvement of data transmission through the new region. In an embodiment, transmission of data packets (video, audio, etc. referred to herein generally as media segments) can be improved by leveraging network knowledge (knowledge of real-time conditions in the network region) at the various locations that device 250 enters and traverses (e.g. as device 250 travels along path 210).

In the example shown in FIG. 2, the device 250 generally moves in region 201, but moves into and out of area 202 where lower bandwidth is available, and traverses area 203 where higher bandwidth networking is available. Area 203 may correspond, for example, to a WiFi hotspot or a location of LTE coverage.

In this embodiment, the mobile device 250 includes a processor on which an MPEG DASH client 251 executes. The MPEG DASH client, running on the mobile device, can take advantage of intermittent availability of higher bandwidth networks by means of a local buffer control algorithm 260 that requests a data packet having a bitrate based on the bandwidth at an anticipated location. In this embodiment, the anticipated location is based on the trajectory of physical movement of the device. When a higher bandwidth is predicted to be available, the buffer control algorithm can request additional low bitrate media segments, high bitrate segments, or a combination of the two to augment or replace the buffering scheme used ordinarily (e.g. while moving in region 201). The buffer control algorithm can use network performance data 261 for various locations (including for example an anticipated location of hotspot 203), and geographic information 262 pertaining to the location of the device. The network performance data 261 can include network characteristics such as jitter or loss rate, in addition to the bandwidth. In this embodiment, both the device location and the network performance can be dynamic; that is, the device 250 can be in motion along path 210, while the higher bandwidth in hotspot 203 is available only intermittently.

Figure 3:
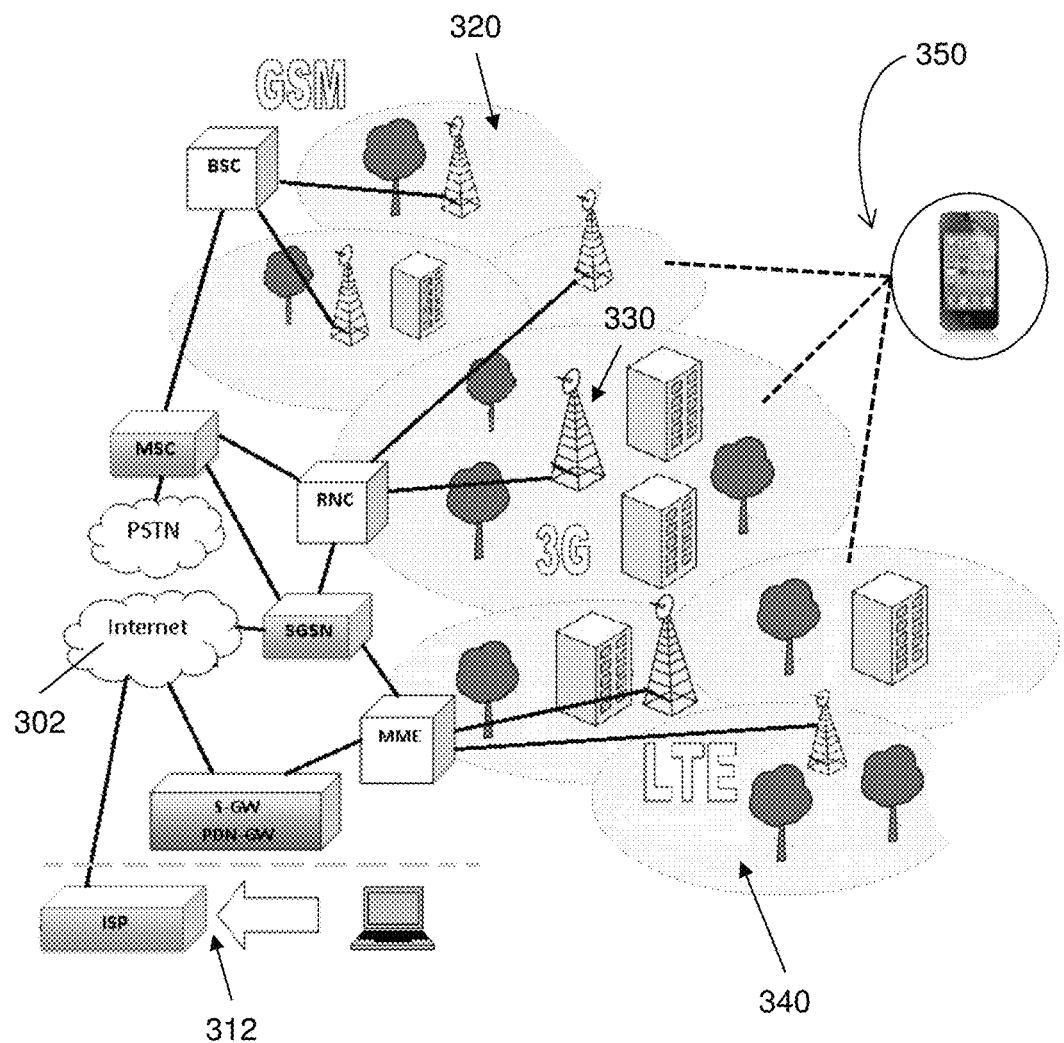
FIG. 3 depicts an illustrative embodiment in which communication networks interact with a mobile communication device.

In an embodiment, the client executing on the mobile device 250 can also evaluate network conditions for a plurality of available networks, to determine an improved network connection for a mobile device at a particular time. For example, as shown in FIG. 3, a mobile device at a location 350 is able to connect with a Global System for Mobile Communications (GSM) network 320, a 3G network 330, or a Long Term Evolution (LTE) network 340. In this embodiment, the client device can process data regarding network traffic and network delays affecting the available bandwidth, and then dynamically select the network providing the highest bandwidth actually available at that location.

It will be appreciated that transport characteristics of the network (traffic, delays, hotspots, etc.) may change over time, even for a device that does not change its location. For example, the device 250 can remain in region 203 while the high-bandwidth network in that region is available only intermittently. In an embodiment, the network transport characteristics include historical data regarding bandwidth available at a given location, so that availability of an intermittent high-bandwidth network (hotspot) can be predicted.

Figure 4:
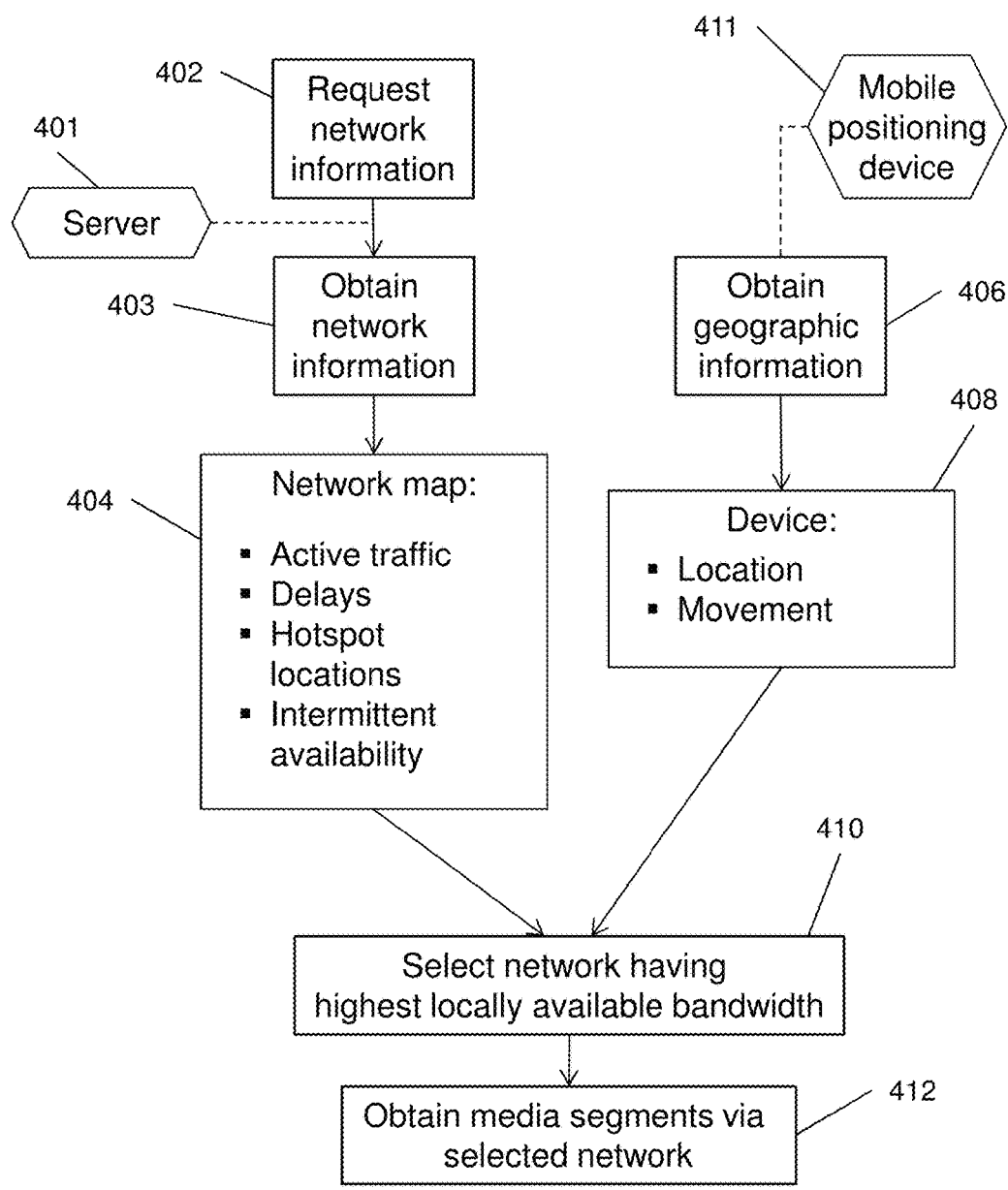
FIG. 4 schematically illustrates a procedure for providing media segments to a mobile device at the highest locally available bandwidth, in accordance with an embodiment of the disclosure.

FIG. 4 illustrates a procedure 400 in which network information in combination with location awareness (knowledge of network characteristics at a geographic location the client device is passing through) is used to select the most advantageous network for the client device to connect with. In an embodiment, the client device requests network information comprising transport characteristics of the network (step 402) and obtains the network information from a server 401 communicating with the client device (step 403). The network information can be provided by a server using a network map (step 404) with information on active traffic conditions, network delays, hotspot locations, availability of intermittent connections, etc.

The client device is equipped with a positioning device 411 so that the client device obtains geographic information (step 406). In this embodiment, the client device has both positioning and motion sensing, so that the device's current location is known and movement to a new location can be predicted (step 408). The client device applies the device location and movement information (current and predicted locations) to select the network with the highest locally available bandwidth (step 410). The client device uses the network map information to transition from one network to another to take advantage of the highest available bandwidth (for example, moving from the network covering area 202 to the network providing hotspot 203). The client device then obtains media segments (step 412) via the network having the best performance at that time and at that location.

In another embodiment, the client device transmits its location and movement data to server 401, which then determines the best-performing network and automatically provides requested media segments using that network.

Figure 5:
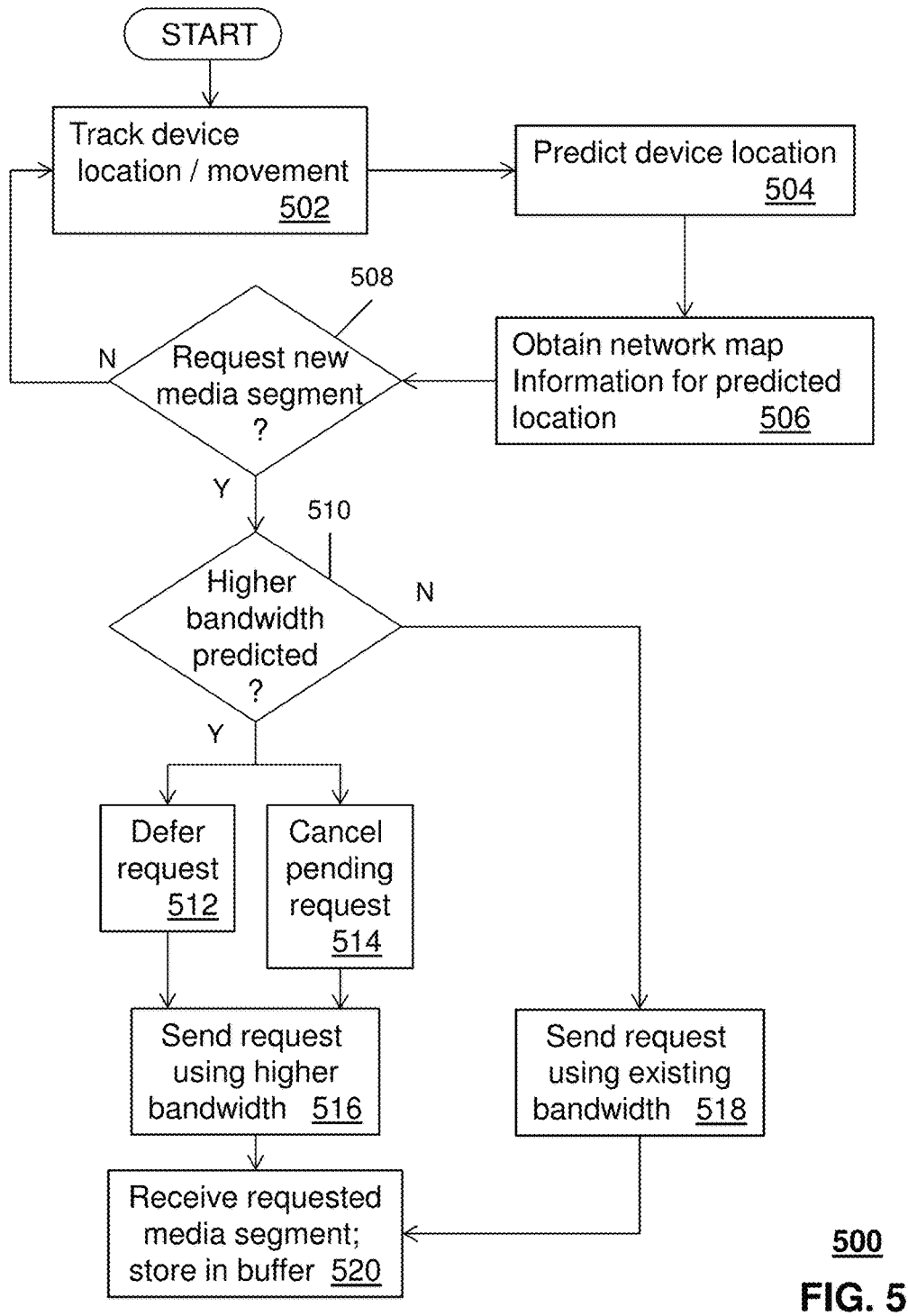
FIG. 5 is a flowchart illustrating a procedure for requesting a media segment at a mobile device, according to an embodiment of the disclosure.

FIG. 5 is a flowchart showing a procedure 500 for requesting a media segment by a mobile device, in accordance with an embodiment. The mobile device's location and movement are tracked (step 502) to predict the device's location (step 504) over a certain time interval (for example, location in the next 10 seconds). Network information is provided by a server using a network map with information on active traffic conditions, delays, etc. for the predicted location (step 506).

A request for a new media segment (e.g. video content) is scheduled using network knowledge, particularly the network information regarding the predicted location of the mobile device. When the mobile device is to make a request for a new media segment (step 508), it is determined (step 510) whether the mobile device is likely to enter a region of higher bandwidth coverage (e.g. WiFi hotspot 203) within the time period for predicting movement (e.g. within 5 seconds when location prediction is for 10 seconds). If not, the request is sent using the presently available bandwidth (step 518).

If higher bandwidth is predicted, the request for the new media segment can be deferred (step 512) and issued when the higher bandwidth coverage becomes available (step 514). For example, if the mobile device buffer is running low such that it will be necessary to request a new media segment within a 5 to 10 second time interval, and it is determined that the mobile device is likely to enter a region of WiFi coverage within 5 seconds, the request can be deferred and issued when the WiFi network becomes available. In addition, pending requests for media segments can be canceled in anticipation of higher bandwidth (step 514) and then re-issued (step 516) to take advantage of the locally greater bandwidth. In an embodiment, the mobile device can take advantage of the higher bandwidth by requesting additional media segments. Media segments received by the mobile device are stored in a buffer for future presentation (step 520). It will be appreciated that by scheduling requests for additional media segments for a time when greater bandwidth is available, and buffering those additional media segments, degradation in viewing quality of media content can be avoided even if the mobile device subsequently operates in a region of reduced bandwidth.

In an embodiment, media requests are scheduled to be sent at a predicted time of higher bandwidth availability. Scheduling can be dynamic, and can be performed on a per client basis.

Figure 6:
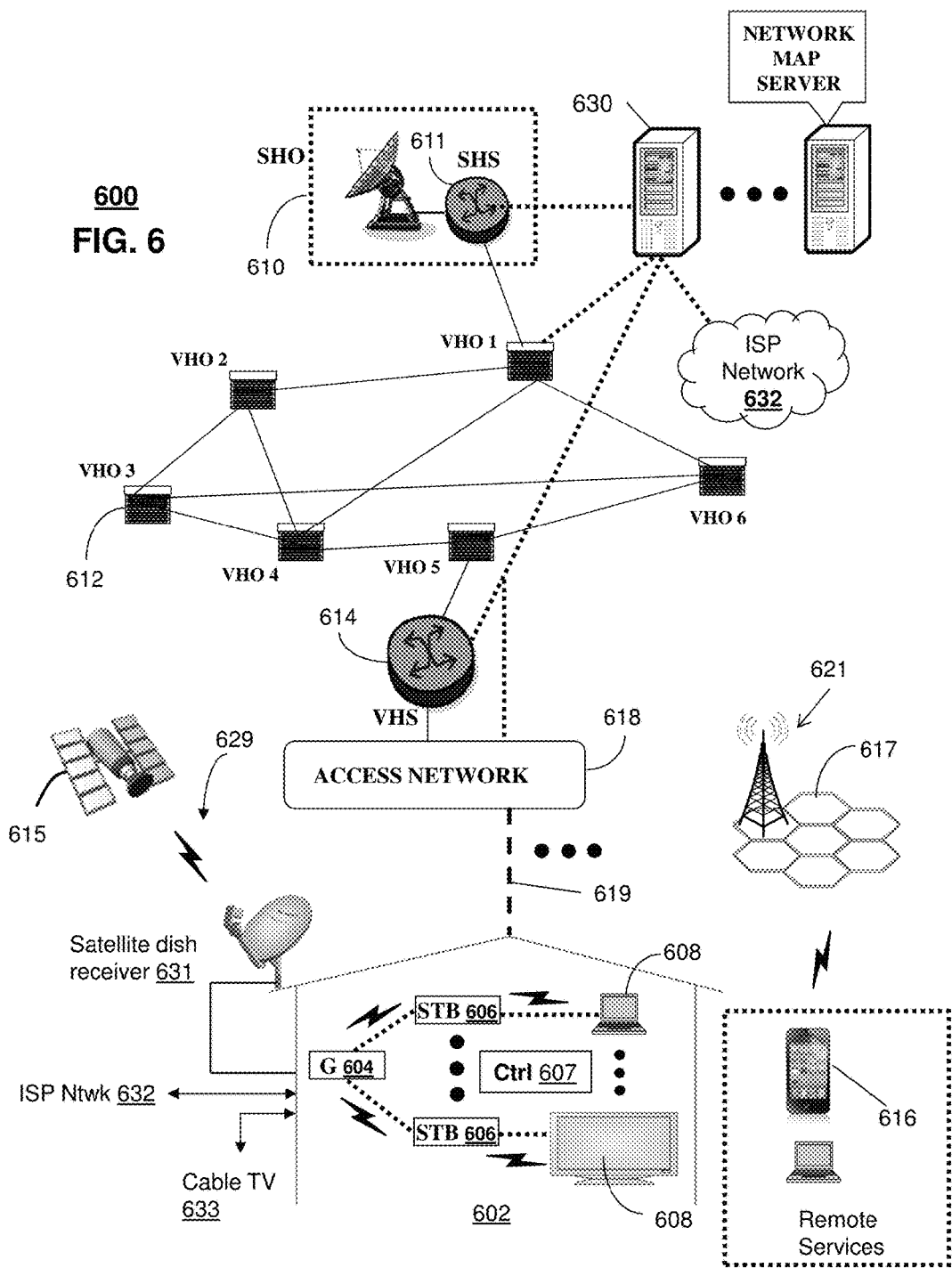
FIG. 6 depicts an illustrative embodiment of a communication system including a wireless communication network.

FIG. 6 depicts an illustrative embodiment of a first communication system 600 for delivering media content. The communication system 600 can represent an Internet Protocol Television (IPTV) media system. Communication system 600 can be overlaid or operably coupled with a system supporting a mobile device client and providing media segments at a locally available bandwidth as another representative embodiment of communication system 600.

As shown in FIG. 6, a mobile communication device 616, communicating with a base station 621 of network 617, can include a memory to store instructions and a controller coupled to the memory. The controller, responsive to executing the instructions, can perform operations including requesting current transport characteristics of a network communicatively coupled to a server and to the mobile device according to a trajectory of physical movement of the mobile device. Data packets can be transported by the network to the mobile device according to a dynamic adaptive streaming over hypertext transfer protocol. The controller can also obtain the current transport characteristics of the network and predict a future transport characteristic of the network in accordance with the trajectory of the physical movement of the mobile device. The controller can also schedule a time for sending a request to the server for transmission over the network of a data packet. The time for sending the request for transmission of the data packet can be scheduled in accordance with the future transport characteristic and the current transport characteristics of the network, to avoid a degradation in a viewing quality of video content presented by the mobile device. The operations further include sending the request responsive to detecting the time to send the request, receiving the data packet responsive to sending the request, and buffering the data packet for a future presentation of the media content, wherein the trajectory of the physical movement of the mobile device is on a path having network elements that provide varying transmission rates to the mobile device.

The IPTV media system can include a super head-end office (SHO) 610 with at least one super headend office server (SHS) 611 which receives media content from satellite and/or terrestrial communication systems. Media content can represent, for example, audio content, moving image content such as 2D or 3D videos, video games, virtual reality content, still image content, and combinations thereof. The SHS server 611 can forward packets associated with the media content to one or more video head-end servers (VHS) 614 via a network of video head-end offices (VHO) 612 according to a multicast communication protocol.

The VHS 614 can distribute multimedia broadcast content via an access network 618 to commercial and/or residential buildings 602 housing a gateway 604 (such as a residential or commercial gateway). The access network 618 can represent a group of digital subscriber line access multiplexers (DSLAMs) located in a central office or a service area interface that provide broadband services over fiber optical links or copper twisted pairs 619 to buildings 602. The gateway 604 can use communication technology to distribute broadcast signals to media processors 606 such as Set-Top Boxes (STBs) which in turn present broadcast channels to media devices 608 such as computers or television sets managed in some instances by a media controller 607 (such as an infrared or RF remote controller).

The gateway 604, the media processors 606, and media devices 608 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies (Bluetooth® and ZigBee® are trademarks registered by the Bluetooth Special Interest Group and the ZigBee Alliance, respectively). By way of these interfaces, unicast communications can also be invoked between the media processors 606 and subsystems of the IPTV media system for services such as video-on-demand (VoD), browsing an electronic programming guide (EPG), or other infrastructure services.

A satellite broadcast television system 629 can be used in the media system of FIG. 6. The satellite broadcast television system can be overlaid, operably coupled with, or replace the IPTV system as another representative embodiment of communication system 600. In this embodiment, signals transmitted by a satellite 615 that include media content can be received by a satellite dish receiver 631 coupled to the building 602. Modulated signals received by the satellite dish receiver 631 can be transferred to the media processors 606 for demodulating, decoding, encoding, and/or distributing broadcast channels to the media devices 608. The media processors 606 can be equipped with a broadband port to an Internet Service Provider (ISP) network 632 to enable interactive services such as VoD and EPG as described above.

In yet another embodiment, an analog or digital cable broadcast distribution system such as a cable TV system 633 can be overlaid, operably coupled with, or replace the IPTV system and/or the satellite TV system as another representative embodiment of the communication system 600. In this embodiment, the cable TV system 633 can provide Internet, telephony, and interactive media services.

The subject disclosure can apply to other present or next generation over-the-air and/or landline media content services system.

Some of the network elements of the IPTV media system can be coupled to one or more computing devices 630, a portion of which can operate as a web server for providing web portal services over the ISP network 632 to wireline media devices 608 or wireless communication devices 616.

Communication system 600 can also provide for all or a portion of the computing devices 630 to function as a network map server providing network information as discussed above. The network map server can use computing and communication technology to provide information on network performance, which can include among other things, information on network traffic and intermittent network availability. The media processors 606 and wireless communication devices 616 can be provisioned with software functions to utilize the services of the network map server.

Multiple forms of media services can be offered to media devices over landline technologies such as those described above. Additionally, media services can be offered to media devices by way of a wireless access base station 617 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 7:
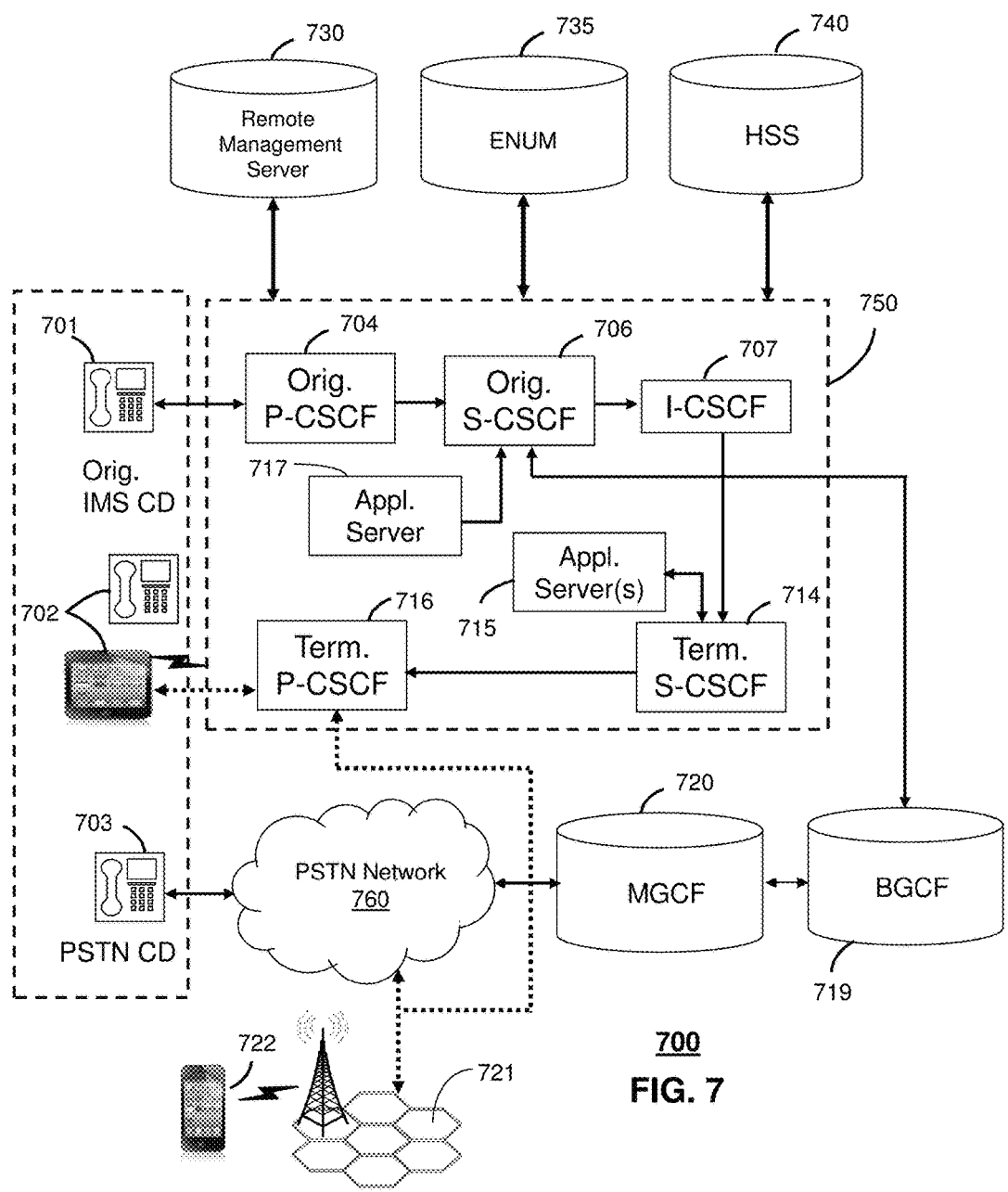
FIG. 7 depicts an illustrative embodiment of a communication system including telephone networks.

FIG. 7 depicts an illustrative embodiment of a communication system 700 employing an IP Multimedia Subsystem (IMS) network architecture to facilitate the combined services of circuit-switched and packet-switched systems. Communication system 700 can be overlaid or operably coupled with communication system 600 as another representative embodiment of communication system 600. In particular, as shown in FIG. 7, a mobile device 722 can communicate with a base station of network 721 and obtain network information regarding the performance of the network.

Communication system 700 can comprise a Home Subscriber Server (HSS) 740, a management server 730, a tElephone NUmber Mapping (ENUM) server 735, and other network elements of an IMS network 750. The IMS network 750 can establish communications between IMS-compliant communication devices (CDs) 701, 702, Public Switched Telephone Network (PSTN) CDs 703, 705, and combinations thereof by way of a Media Gateway Control Function (MGCF) 720 coupled to a PSTN network 760. The MGCF 720 need not be used when a communication session involves IMS CD to IMS CD communications. A communication session involving at least one PSTN CD may utilize the MGCF 720.

IMS CDs 701, 702 can register with the IMS network 750 by contacting a Proxy Call Session Control Function (P-CSCF) which communicates with an interrogating CSCF (I-CSCF), which in turn, communicates with a Serving CSCF (S-CSCF) to register the CDs with the HSS 740. To initiate a communication session between CDs, an originating IMS CD 701 can submit a Session Initiation Protocol (SIP INVITE) message to an originating P-CSCF 704 which communicates with a corresponding originating S-CSCF 706. The originating S-CSCF 706 can submit the SIP INVITE message to one or more application servers (ASs) 717 that can provide a variety of services to IMS subscribers.

For example, the application servers 717 can be used to perform originating call feature treatment functions on the calling party number received by the originating S-CSCF 706 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 706 can submit queries to the ENUM system 735 to translate an E.164 telephone number in the SIP INVITE message to a SIP Uniform Resource Identifier (URI) if the terminating communication device is IMS-compliant. The SIP URI can be used by an Interrogating CSCF (I-CSCF) 707 to submit a query to the HSS 740 to identify a terminating S-CSCF 714 associated with a terminating IMS CD such as reference 702. Once identified, the I-CSCF 707 can submit the SIP INVITE message to the terminating S-CSCF 714. The terminating S-CSCF 714 can then identify a terminating P-CSCF 716 associated with the terminating CD 702. The P-CSCF 716 may then signal the CD 702 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 7 may be interchangeable. It is further noted that communication system 700 can be adapted to support video conferencing. In addition, communication system 700 can be adapted to provide the IMS CDs 701, 702 with the multimedia and Internet services of communication system 600 of FIG. 6.

If the terminating communication device is instead a PSTN CD such as CD 703 or CD 705 (in instances where the cellular phone only supports circuit-switched voice communications), the ENUM system 735 can respond with an unsuccessful address resolution which can cause the originating S-CSCF 706 to forward the call to the MGCF 720 via a Breakout Gateway Control Function (BGCF) 719. The MGCF 720 can then initiate the call to the terminating PSTN CD over the PSTN network 760 to enable the calling and called parties to engage in voice and/or data communications.

It is further appreciated that the CDs of FIG. 7 can operate as wireline or wireless devices. For example, the CDs of FIG. 7 can be communicatively coupled to a cellular base station 721, a femtocell, a WiFi router, a Digital Enhanced Cordless Telecommunications (DECT) base unit, or another suitable wireless access unit to establish communications with the IMS network 750 of FIG. 7. The cellular access base station 721 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 7.

Cellular phones supporting LTE can support packet-switched voice and packet-switched data communications and thus may operate as IMS-compliant mobile devices 722. In this embodiment, the cellular base station 721 may communicate directly with the IMS network 750 as shown by the arrow connecting the cellular base station 721 and the P-CSCF 716. In particular, the cellular phone (mobile device) comprises a processor and can perform a method including requesting, by the mobile device, current transport characteristics of a network communicatively coupled to a server and to the mobile device according to a trajectory of the mobile device. Data packets are transported by the network to the mobile device according to a dynamic adaptive streaming over hypertext transfer protocol. The method can include obtaining, by the mobile device, the current transport characteristics of the network. The method can include predicting, by the mobile device, a future transport characteristic of the network in accordance with the trajectory of the mobile device. The method can include scheduling, by the mobile device, a time for sending a request to the server for transmission over the network of a data packet. The time for sending the request for transmission of the data packet can be scheduled in accordance with the future transport characteristic and the current transport characteristics of the network, to avoid a degradation in a viewing quality of media content presented by the mobile device. The trajectory of the mobile device is on a path having network elements that provide varying transmission rates to the mobile device.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The network map server of FIG. 6 can be operably coupled to the second communication system 700 for purposes similar to those described above. The network map server can be an integral part of the application server(s) 717, which can be adapted to the operations of the IMS network 750.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 8:
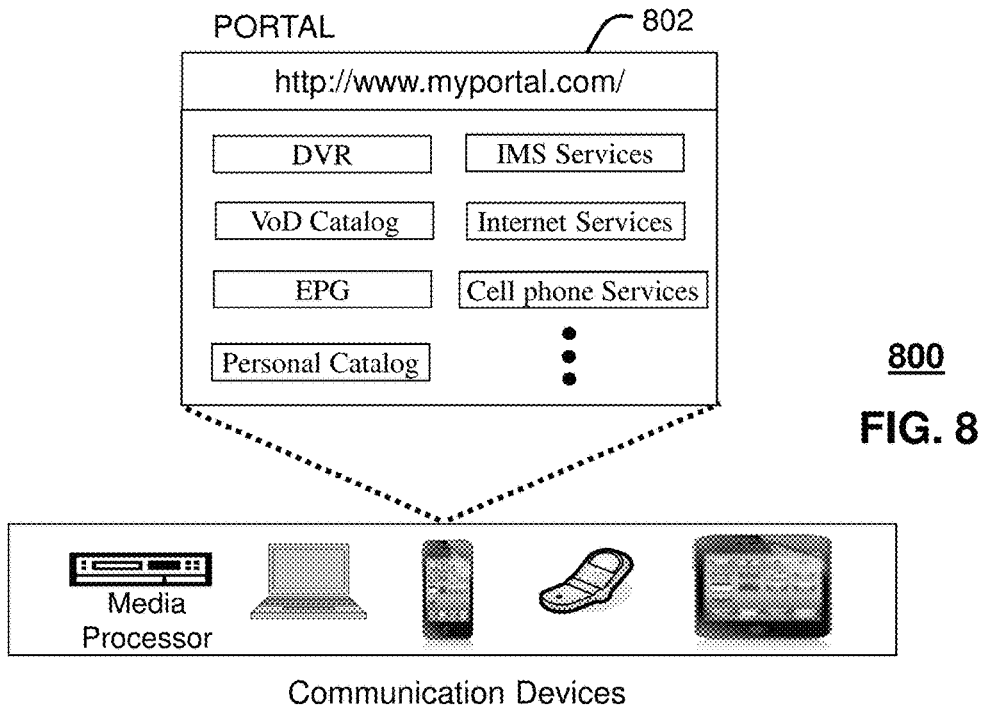
FIG. 8 depicts an illustrative embodiment of a web portal for interacting with client devices included in the communication system of FIG. 7.

FIG. 8 depicts an illustrative embodiment of a communication system 800 including a web portal 802 which can be hosted by server applications operating from the computing devices 630 of the communication system 600 illustrated in FIG. 6. Communication system 800 can be overlaid or operably coupled with communication system 600 as another representative embodiment of the disclosure. The communication devices shown in FIG. 8 are examples of devices that can communicate with networks as shown in FIG. 1. In an embodiment, a mobile device as shown in FIG. 8 can comprise a processor and perform a method including requesting, by the mobile device, current transport characteristics of a network communicatively coupled to a server and to the mobile device according to a trajectory of the mobile device. Data packets are transported by the network to the mobile device according to a dynamic adaptive streaming over hypertext transfer protocol. The method can include obtaining, by the mobile device, the current transport characteristics of the network. The method can include predicting, by the mobile device, a future transport characteristic of the network in accordance with the trajectory of the mobile device. The method can include scheduling, by the mobile device, a time for sending a request to the server for transmission over the network of a data packet. The time for sending the request for transmission of the data packet can be scheduled in accordance with the future transport characteristic and the current transport characteristics of the network, to avoid a degradation in a viewing quality of media content presented by the mobile device. The trajectory of the mobile device is on a path having network elements that provide varying transmission rates to the mobile device.

The web portal 802 can be used for managing services of communication systems 600-700. A web page of the web portal 802 can be accessed by a Uniform Resource Locator (URL) with an Internet browser using an Internet-capable communication device such as those described in FIGS. 1-2. The web portal 802 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 606. The web portal 802 can also be used for provisioning IMS services described earlier, provisioning Internet services, provisioning cellular phone services, and so on.

Figure 9:
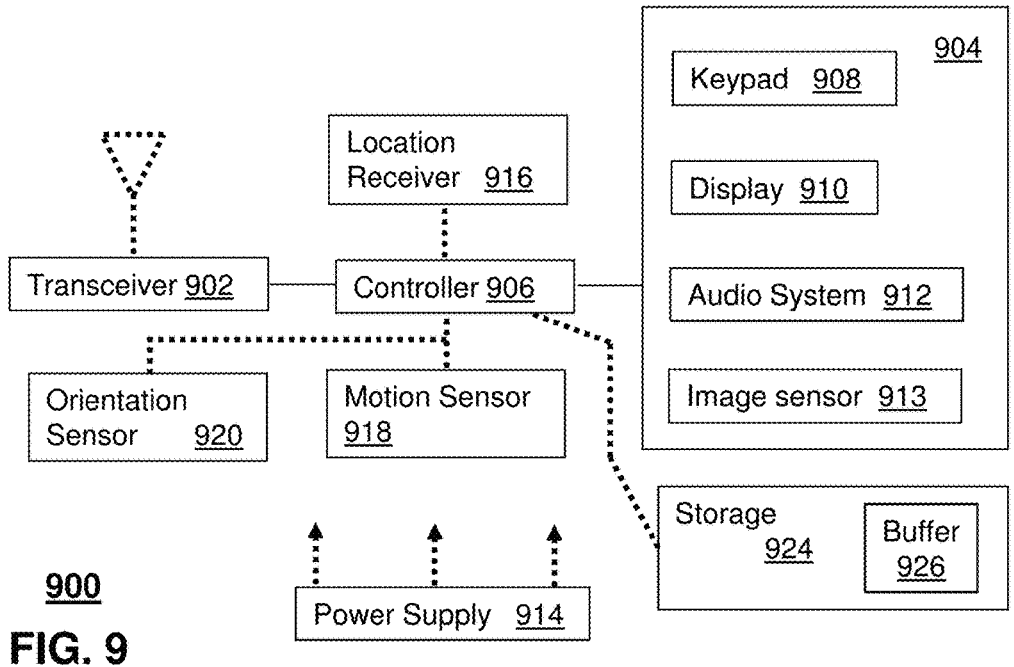
FIG. 9 depicts an illustrative embodiment of a communication device.

FIG. 9 depicts an illustrative embodiment of a communication device 900. Communication device 900 can serve in whole or in part as an illustrative embodiment of the mobile devices depicted in FIGS. 1-3 and FIGS. 6-7. Communication device 900 can include a computer-readable storage device 924 comprising executable instructions which, when executed by a processor (e.g. controller 906), cause the processor to perform operations. The operations include requesting transport characteristics of a network communicatively coupled to a server and to the mobile device according to a trajectory of the mobile device. Data packets are transported by the network to the mobile device according to a dynamic adaptive streaming over hypertext transfer protocol. The operations can include obtaining the current transport characteristics of the network. The operations can include predicting a future transport characteristic of the network, in accordance with the trajectory of the mobile device. The operations can include scheduling a time for sending a request to the server for transmission over the network of a data packet. The time for sending the request for transmission of the data packet can be scheduled in accordance with the future transport characteristic and the current transport characteristics of the network, to avoid a degradation in a quality of media content presented by the mobile device. The storage device 924 can include a buffer 926 for the data packets.

To enable these features, communication device 900 can comprise a wireline and/or wireless transceiver 902 (herein transceiver 902), a user interface (UI) 904, a power supply 914, a location receiver 916, a motion sensor 918, an orientation sensor 920, and a controller 906 for managing operations thereof. The transceiver 902 can support short-range or long-range wireless access technologies such as Bluetooth®, ZigBee®, WiFi, DECT, or cellular communication technologies, just to mention a few. Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 902 can also be adapted to support circuit-switched wireline access technologies (such as PSTN), packet-switched wireline access technologies (such as TCP/IP, VoIP, etc.), and combinations thereof.

The UI 904 can include a depressible or touch-sensitive keypad 908 with a navigation mechanism such as a roller ball, a joystick, a mouse, or a navigation disk for manipulating operations of the communication device 900. The keypad 908 can be an integral part of a housing assembly of the communication device 900 or an independent device operably coupled thereto by a tethered wireline interface (such as a USB cable) or a wireless interface supporting for example Bluetooth. The keypad 908 can represent a numeric keypad commonly used by phones, and/or a QWERTY keypad with alphanumeric keys. The UI 904 can further include a display 910 such as monochrome or color LCD (Liquid Crystal Display), OLED (Organic Light Emitting Diode) or other suitable display technology for conveying images to an end user of the communication device 900. In an embodiment where the display 910 is touch-sensitive, a portion or all of the keypad 908 can be presented by way of the display 910 with navigation features.

The display 910 can use touch screen technology to also serve as a user interface for detecting user input. As a touch screen display, the communication device 900 can be adapted to present a user interface with graphical user interface (GUI) elements that can be selected by a user with a touch of a finger. The touch screen display 910 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 910 can be an integral part of the housing assembly of the communication device 900 or an independent device communicatively coupled thereto by a tethered wireline interface (such as a cable) or a wireless interface.

The UI 904 can also include an audio system 912 that utilizes audio technology for conveying low volume audio (such as audio heard in proximity of a human ear) and high volume audio (such as speakerphone for hands free operation). The audio system 912 can further include a microphone for receiving audible signals of an end user. The audio system 912 can also be used for voice recognition applications. The UI 904 can further include an image sensor 913 such as a charged coupled device (CCD) camera for capturing still or moving images.

The power supply 914 can utilize common power management technologies such as replaceable and rechargeable batteries, supply regulation technologies, and/or charging system technologies for supplying energy to the components of the communication device 900 to facilitate long-range or short-range portable applications. Alternatively, or in combination, the charging system can utilize external power sources such as DC power supplied over a physical interface such as a USB port or other suitable tethering technologies.

The location receiver 916 can utilize location technology such as a global positioning system (GPS) receiver capable of assisted GPS for identifying a location of the communication device 900 based on signals generated by a constellation of GPS satellites, which can be used for facilitating location services such as navigation. The motion sensor 918 can utilize motion sensing technology such as an accelerometer, a gyroscope, or other suitable motion sensing technology to detect motion of the communication device 900 in three-dimensional space. The orientation sensor 920 can utilize orientation sensing technology such as a magnetometer to detect the orientation of the communication device 900 (north, south, west, and east, as well as combined orientations in degrees, minutes, or other suitable orientation metrics).

The communication device 900 can use the transceiver 902 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 906 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 900.

Other components not shown in FIG. 9 can be used in one or more embodiments of the subject disclosure. For instance, the communication device 900 can include a reset button (not shown). The reset button can be used to reset the controller 906 of the communication device 900. In yet another embodiment, the communication device 900 can also include a factory default setting button positioned, for example, below a small hole in a housing assembly of the communication device 900 to force the communication device 900 to re-establish factory settings. In this embodiment, a user can use a protruding object such as a pen or paper clip tip to reach into the hole and depress the default setting button. The communication device 600 can also include a slot for adding or removing an identity module such as a Subscriber Identity Module (SIM) card. SIM cards can be used for identifying subscriber services, executing programs, storing subscriber data, and so forth.

The communication device 900 as described herein can operate with more or fewer of the circuit components shown in FIG. 9. These variant embodiments can be used in one or more embodiments of the subject disclosure.

The communication device 900 can be adapted to perform the functions of the media processor 606, the media devices 608, or the portable communication devices 616 of FIG. 6, as well as the IMS CDs 701-702 and PSTN CDs 703 of FIG. 7. It will be appreciated that the communication device 900 can also represent other devices that can operate in communication systems 600-700 of FIGS. 6-7 such as a gaming console and a media player.

The communication device 900 shown in FIG. 9 or portions thereof can serve as a representation of one or more of the devices of FIGS. 1-3, communication system 600, and communication system 700.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 10:
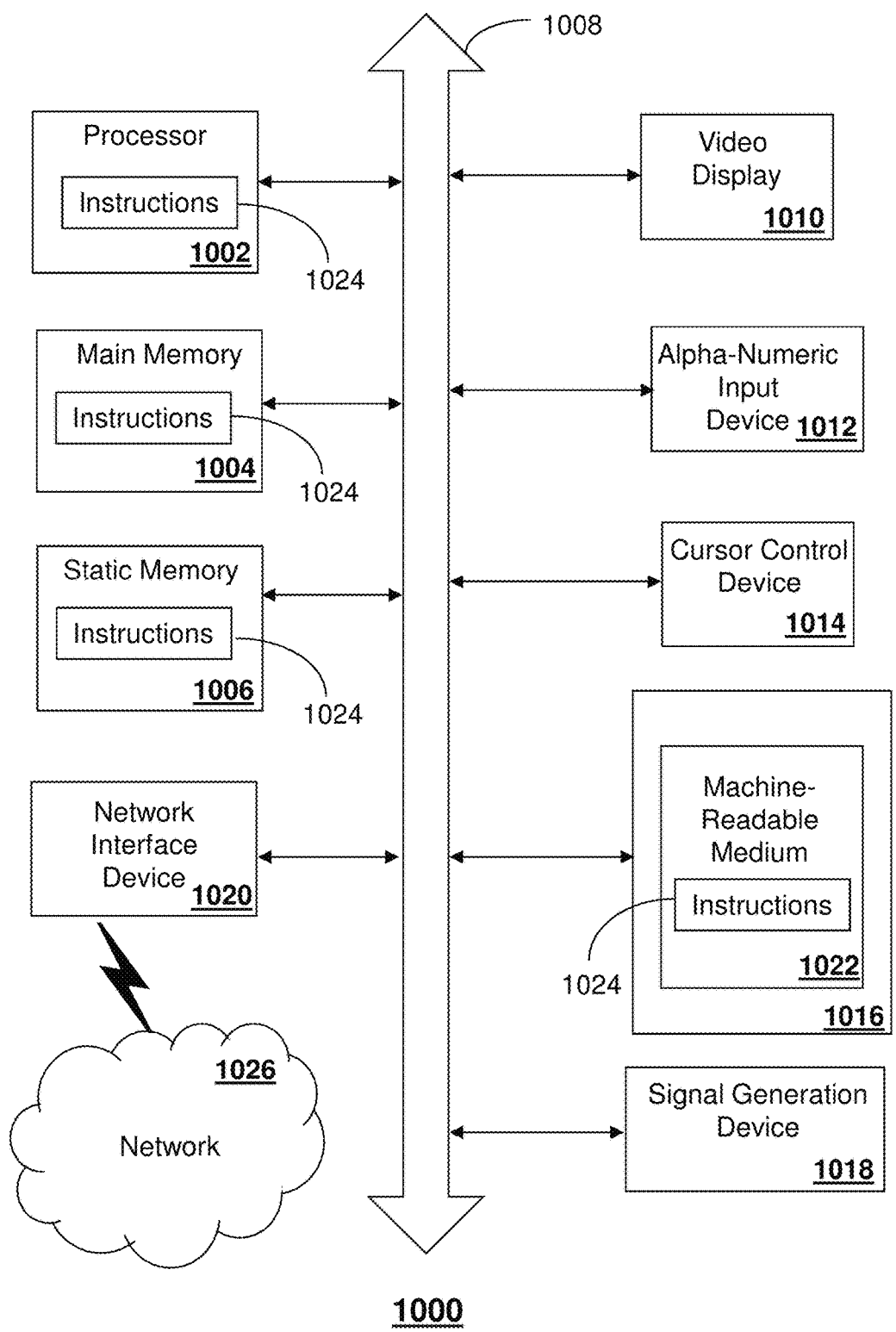
FIG. 10 is a diagrammatic representation of a machine in the form of a computer system within which a set of instructions, when executed, may cause the machine to perform any one or more of the methods described herein.

FIG. 10 depicts an exemplary diagrammatic representation of a machine in the form of a computer system 1000 within which a set of instructions, when executed, may cause the machine to perform any one or more of the methods described above. One or more instances of the machine can operate, for example, as the network map server, the mobile device, and other devices of FIGS. 1-3. In some embodiments, the machine may be connected (e.g., using a network 1026) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor (or controller) 1002 (e.g., a central processing unit (CPU), a graphics processing unit (GPU, or both), a main memory 1004 and a static memory 1006, which communicate with each other via a bus 1008. The computer system 1000 may further include a display unit 1010 (e.g., a liquid crystal display (LCD), a flat panel, or a solid state display. The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020. In distributed environments, the embodiments described in the subject disclosure can be adapted to utilize multiple display units 1010 controlled by two or more computer systems 1000. In this configuration, presentations described by the subject disclosure may in part be shown in a first of the display units 1010, while the remaining portion is presented in a second of the display units 1010.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1022 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1000.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A mobile device, comprising:
a processing system including a processor; and
a memory that stores executable instructions that, when executed by the processing system, facilitate performance of operations, comprising:
selecting a network element of a first network as a selected network element having a predicted transport characteristic, wherein the predicted transport characteristic is predicted according to a trajectory of a physical movement of the mobile device, current transport characteristics of the first network, and historical data associated with a time-varying transport characteristic of the first network for a location corresponding to a predicted location of the mobile device, and wherein the trajectory of the physical movement of the mobile device is on a path in a vicinity of a plurality of network elements of the first network, including the selected network element, that provide varying transmission rates to the mobile device;

predicting an availability of a second network based on information obtained from a network map server, wherein the mobile device is communicatively coupled with the first network and subsequently with the second network in accordance with an availability of the second network at the predicted location and based on a bandwidth available from the second network at the predicted location;

determining a scheduled time for sending a request to a server for transmission over the second network of a data packet, the scheduled time being determined in order to maintain a quality of video content presented by the mobile device by preventing a potential degradation in the quality of the video content;

sending the request to the server responsive to detecting the time to send the request, the request being for transmission over the second network of the data packet, wherein the data packet has a bitrate based on the bandwidth available at the predicted location for the second network, wherein the determining the scheduled time comprises deferring the sending of the request as a pending request until the mobile device is communicatively coupled with the second network;

receiving the data packet from the server via the second network responsive to sending the request; and buffering the data packet for a future presentation of the video content at the mobile device to prevent the potential degradation in the quality of the video content.

2. The mobile device of claim 1, wherein the information obtained from the network map server comprises traffic conditions, network delays, hotspot locations or a combination thereof.

3. The mobile device of claim 1, wherein the varying transmission rates are based on an intermittent characteristics of network performance data for the predicted location.

4. The mobile device of claim 1, wherein the operations further comprise canceling a current request for media content, as a canceled request, responsive to the mobile device being communicatively coupled with the selected network element when the trajectory indicates the mobile device will become communicatively coupled to a different network element within a predetermined time.

5. The mobile device of claim 4, wherein the operations further comprise re-issuing the canceled request responsive to the mobile device becoming communicatively coupled to the different network element.

6. The mobile device of claim 1, wherein the mobile device is communicatively coupled with the first network when at a first location and subsequently with the second network in accordance with the physical movement of the mobile device, wherein the second network is different from the first network and wherein the bandwidth available from the second network is greater than a bandwidth of the selected network element.

7. The mobile device of claim 1, wherein the current transport characteristics comprise network traffic, delays, and availability for each of a plurality of networks accessible by the mobile device.

8. The mobile device of claim 7, wherein the operations further comprise:
predicting a second location of the mobile device according to the trajectory of the physical movement of the mobile device when the mobile device is at a first location, and selecting, from the plurality of network elements, a network having a greatest available bandwidth at the second location.

9. The mobile device of claim 1, wherein the operations further comprise:
obtaining location information and movement information for the mobile device using a location receiver and a motion sensor of the mobile device, and monitoring the current transport characteristics of the first network via the network map server remote from the mobile device.

10. A method, comprising:
selecting, by a mobile device including processing system comprising a processor, a network element of a first network as a selected network element having a predicted transport characteristic predicted according to a trajectory of the mobile device, current transport characteristics of the first network, and historical data associated with a time-varying transport characteristic of the first network for a location corresponding to a predicted location of the mobile device, wherein the trajectory of the mobile device is on a path having network elements of the first network that provide varying transmission rates to the mobile device;

predicting, by the mobile device, an availability of a second network at the predicted location based on information obtained from a network map server, wherein the mobile device is communicatively coupled with the first network and subsequently with the second network in accordance with availability of the second network;

scheduling, by the mobile device, a time for sending a request for transmission over the second network of a data packet to a server based on the predicted transport characteristic and a bitrate based on a bandwidth available from the second network at the predicted location to prevent a potential degradation in a quality of the data packet;

sending, by the mobile device, the request to the server responsive to detecting the time to send the request, wherein transmission of the request is deferred until the mobile device is communicatively coupled with the second network;

receiving, by the mobile device, the data packet from the server via the second network responsive to sending the request; and buffering, by the mobile device, the data packet for a future use of the data packet at the mobile device to prevent the potential degradation in the quality of the data packet.

11. The method of claim 10, wherein the second network is different from the first network and wherein the bandwidth available from the second network is greater a bandwidth than that of the first network.

12. The method of claim 10, further comprising canceling a pending request for media content, as a canceled request, responsive to the mobile device being predicted to be communicatively coupled with the second network in a predetermined amount of time based on the trajectory of the mobile device.

13. The method of claim 12, further comprising re-issuing the canceled request via the second network upon becoming communicatively coupled with the second network.

14. The method of claim 10, wherein the current transport characteristics comprise network traffic, delays, and availability for each of a plurality of networks accessible by the processing system.

15. A non-transitory, machine-readable storage medium, comprising executable instructions that, when executed by a processing system including a processor, facilitate performance of operations, comprising:
    determining a scheduled time for sending a request to a server for transmission of a data packet over a selected network element of a first network to reduce a potential degradation in a quality of video content presented by a mobile device, wherein the selected network element is selected based on a predicted transport characteristic predicted according to a trajectory of a physical movement of the mobile device and according to current transport characteristics of the first network;
    predicting an availability of a second network element at a predicted location based on information obtained from a network map server, wherein the mobile device is communicatively coupled with the selected network element and subsequently with the second network element in accordance with availability of the second network element, and wherein a first bandwidth available to the selected network element is less than a second bandwidth available from the second network at the predicted location;
    sending the request to the server according to the scheduled time to send the request, wherein the data packet has a bitrate based on the second bandwidth available from the second network element at the predicted location, wherein the trajectory of the mobile device is on a path having network elements of the first network that provide varying transmission rates to the mobile device, and wherein transmission of the request is deferred until the mobile device is communicatively coupled with the second network;
    receiving the data packet from the server via the second network element responsive to sending the request; and
    buffering the data packet for a future presentation of the video content at the mobile device to prevent the potential degradation in the quality of the video content.

16. The non-transitory, machine-readable storage medium of claim 15, wherein the predicted transport characteristic is predicted according to historical data regarding a time-varying transport characteristic of the first network for a location corresponding to the predicted location of the mobile device, and wherein the current transport characteristics comprise network traffic, delays, and availability for each of a plurality of networks accessible by the mobile device.

17. The non-transitory, machine-readable storage medium of claim 15, wherein the second network element is different from the first network.

18. The machine-readable storage medium of claim 15, wherein the varying transmission rates are based on an intermittent performance of a wireless access point.

19. The non-transitory, machine-readable storage medium of claim 15, wherein a request for media content is cancelled, as a canceled request, responsive to the mobile device being predicted to be communicatively coupled with the second network element in a predetermined amount of time based on the trajectory of the mobile device.

20. The non-transitory, machine-readable storage medium of claim 19, wherein the operations further comprise re-issuing the canceled request via the second network element responsive to the mobile device being communicatively coupled with the second network element.

* * * * *